United States Patent [19]

Lerman et al.

[11] 4,372,461
[45] Feb. 8, 1983

[54] COVER BALANCE ASSEMBLY AND GASKET PROTECTOR DEVICE

[75] Inventors: Michael J. Lerman, Edison; William Zamory, Somerville, both of N.J.

[73] Assignee: De Dietrich (USA) Inc., Union, N.J.

[21] Appl. No.: 326,516

[22] Filed: Dec. 2, 1981

[51] Int. Cl.³ .................... B65D 17/50; B65D 41/02; B65D 43/24

[52] U.S. Cl. .................................. 220/260; 220/335; 220/211

[58] Field of Search ................. 220/3, 260, 334, 335, 220/343, 378, 263, 264, 211

[56] References Cited

U.S. PATENT DOCUMENTS 2,729,416 1/1956 Waas .............................. 220/335 X
3,209,938 10/1965 De Frees ............................ 220/260

OTHER PUBLICATIONS

"Glass-Lined Equipment," De Dietrich (USA), Inc., Union, New Jersey 07083, 4/79.

"Spring-Balance Manhole Covers," SYBRON, Pfaudler, Rochester, New York 14603, 12/77.

Primary Examiner—George T. Hall
Attorney, Agent, or Firm—Pennie & Edmonds

[57] ABSTRACT

The invention relates to an assembly and structure for exerting a constant force on a pivot pin supporting a movable component of a hinge for elevating the axis about which the movable component pivots. The movable component connected between the pivot pin and a cover, so elevated and maintained elevated during operative movements of the cover, permits movements of the cover in opening and closing the entry through a nozzle of a reactor, particularly a glass-lined reactor, into the interior in a manner whereby any gasket or sealing structure disposed either around the cover or the nozzle may be protected from damage. The invention, also, relates to structure for mounting the assembly and structure, which may include additional structure for assist in opening and closing the cover, to a stationary component of the hinge.

15 Claims, 4 Drawing Figures

COVER BALANCE ASSEMBLY AND GASKET PROTECTOR DEVICE

DESCRIPTION

1. Technical Field

The invention relates to an assembly and structure for exerting a constant force on a pivot pin supporting a movable component of a hinge for elevating the axis about which the movable component pivots. The movable component connected between the pivot pin and a cover, so elevated and maintained elevated during operative movements of the cover, permits movements of the cover in opening and closing the entry through a nozzle of a reactor, particularly a glass-lined reactor, into the interior in a manner whereby any gasket or sealing structure disposed either around the cover or the nozzle may be protected from damage. The invention, also, relates to structure for mounting the assembly and structure, which may include additional structure for assist in opening and closing the cover, to a stationary component of the hinge.

2. Background Art

Vessels in the form of reactors of the glass-lined type including one or more nozzles and a cover adapted for movement about a pivot axis in opening and closing the entry through each nozzle to the interior of the reactor are known in the prior art. Such reactors may include a ring serving as a protection ring received on and secured to the surface of the nozzle around the entry into the interior of the reactor. Typically, a gasket is disposed between the protection ring and the surface of the nozzle around the entry opening, and a second gasket, in the cover closed position, will be disposed between the cover and the protection ring. As found in the prior art, the stationary component of the hinge providing the pivot axis about which the cover moves oftentimes is carried by the vessel within the region of the nozzle; and oftentimes the stationary component of the hinge is carried by the protection ring, itself. In the former construction, the stationary component of the hinge typically supports an adaptor which will comprise a part of the movable component of the hinge to accommodate the increased spacing between the nozzle and cover. The stationary component of the hinge generally is formed with an opening elongated in substantially the vertical direction to permit movement of the pivot pin along the length of the opening as the cover is releasably locked to the nozzle. Particularly, movement of the pivot pin along the elongated opening permits movement of the cover in a direction substantially normal to the plane of the surface of the nozzle, or the surface of the protection ring, and in an orientation so that the cover, when releasably locked to the nozzle, will exert a substantially uniform sealing force on each increment of gasket, either the gasket located between the cover and the surface of the nozzle or the gasket located between the cover and the surface of the protection ring.

The prior art structures, also, are known to include a mechanism for assist in opening and closing the cover so that the operation may be carried out more easily and with greater safety. The assist structure generally will permit the cover to remain in any position between its limits of movement without support and prevents movement of the cover in an unimpeded manner to the closed position which, through the force of closure, may result in breakage of the glass lining within the region of the nozzle of the reactor, or elsewhere.

These prior art structures, however, have been found to suffer from at least one important disadvantage. To this end, the elongated opening within the stationary component of the hinge permitting movement of the pivot pin and the function previously discussed gives rise, also, to an undesirable interaction of structure. Thus, when the cover is opened or closed the outer edge of the cover gasket within the region between the hinge lugs of the stationary component of the hinge is used as a pivot point, and, in addition, there may be a measure of sliding movement of the cover gasket either along the protection ring or the surface of the nozzle. When the cover is moved to the open position this action will occur prior to movement of the pivot pin under the weight of the cover to the lower region of the elongated opening. Substantially the opposite condition will occur when the cover is moved to the closed position. Repeated opening and closing of the cover has been found to result in an abrading and/or crimping, and ultimate breakage of the gasket material. While the problem may be more acute under circumstances that a protection ring is used, the operative interaction of structure and damage sustained will result in a loss of sealing capability, requiring replacement of the damaged gasket.

SUMMARY OF THE INVENTION

The present invention is one which overcomes the disadvantage described above and other problems and disadvantages of the prior art. Particularly, it is an important aspect of the present invention to provide an assembly for use in combination with vessels, which may be existing vessels, formed by a closed-wall structure including a nozzle providing an entryway to the interior and a cover movable between an entryway open position and a position at which the cover is closely juxtaposed to the entryway. The assembly functions to act upon the pivot pin about which the cover pivots to exert a constant force thereby to locate the pivot axis about which the cover moves in a plane whereby there is a measure of clearance between the cover and cover gasket and the seat, either the nozzle itself or a protection ring sealingly secured to the nozzle, onto which the cover is sealingly located to seal the entryway. Accordingly, the cover moves in the opening direction initially from a position at which there is no contact with the seat and no opportunity that the cover gasket will act as a pivot point during movement. The opportunity of the cover gasket acting as a pivot point is prevented, during movement in the closing direction, also.

As indicated, the assembly may be mounted on substantially any vessel. To this end, the assembly includes structure which uniquely provides a mounting bracket, and the structure may support either or both the assembly for relocation of the pivot axis and an assembly for assist in opening and closing the cover.

The constant force exerted on the pivot pin may derive from any source. In a preferred form of the invention the source includes a multiplicity of disc springs acting between a stationary housing and a follower or lifter connected to the pivot pin.

A mounting bracket which supports the housing and disc springs, as well as the lifter, is designed to be supported on the stationary hinge component or hinge lug, which, in turn, is supported either on the vessel or the protection ring.

Further advantages of the present invention will become clear as the description, read in conjunction with a view of the drawing, continues.

BEST MODE FOR CARRYING OUT THE INVENTION

Figure 1:
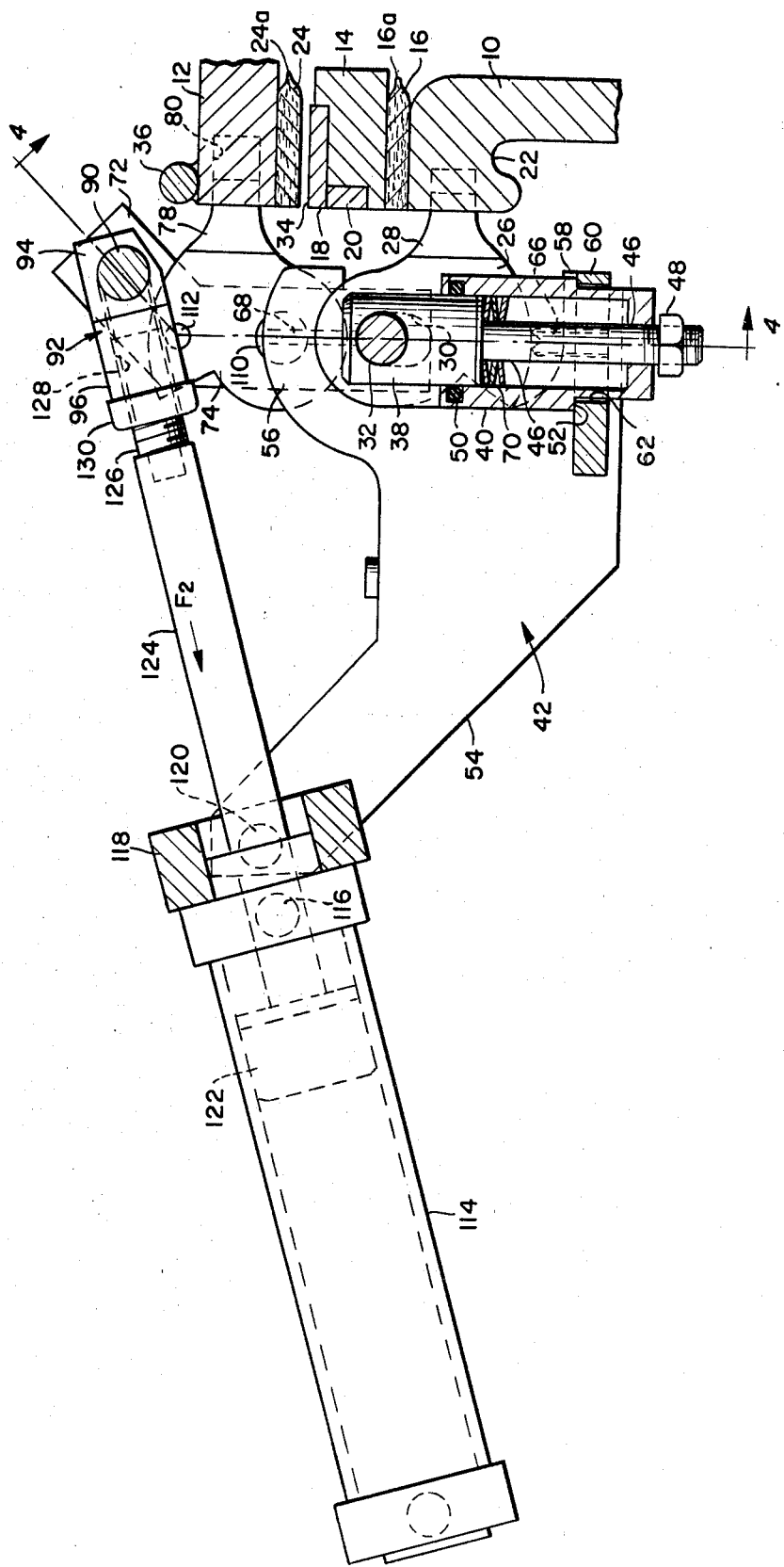
FIG. 1 is a view in elevation and partially in section of the structural components, generally to the left of a center action line (as viewed toward the vessel), of the cover balance and gasket protector assembly of the present invention as located in substantially a cover-closed position.
Figure 2:
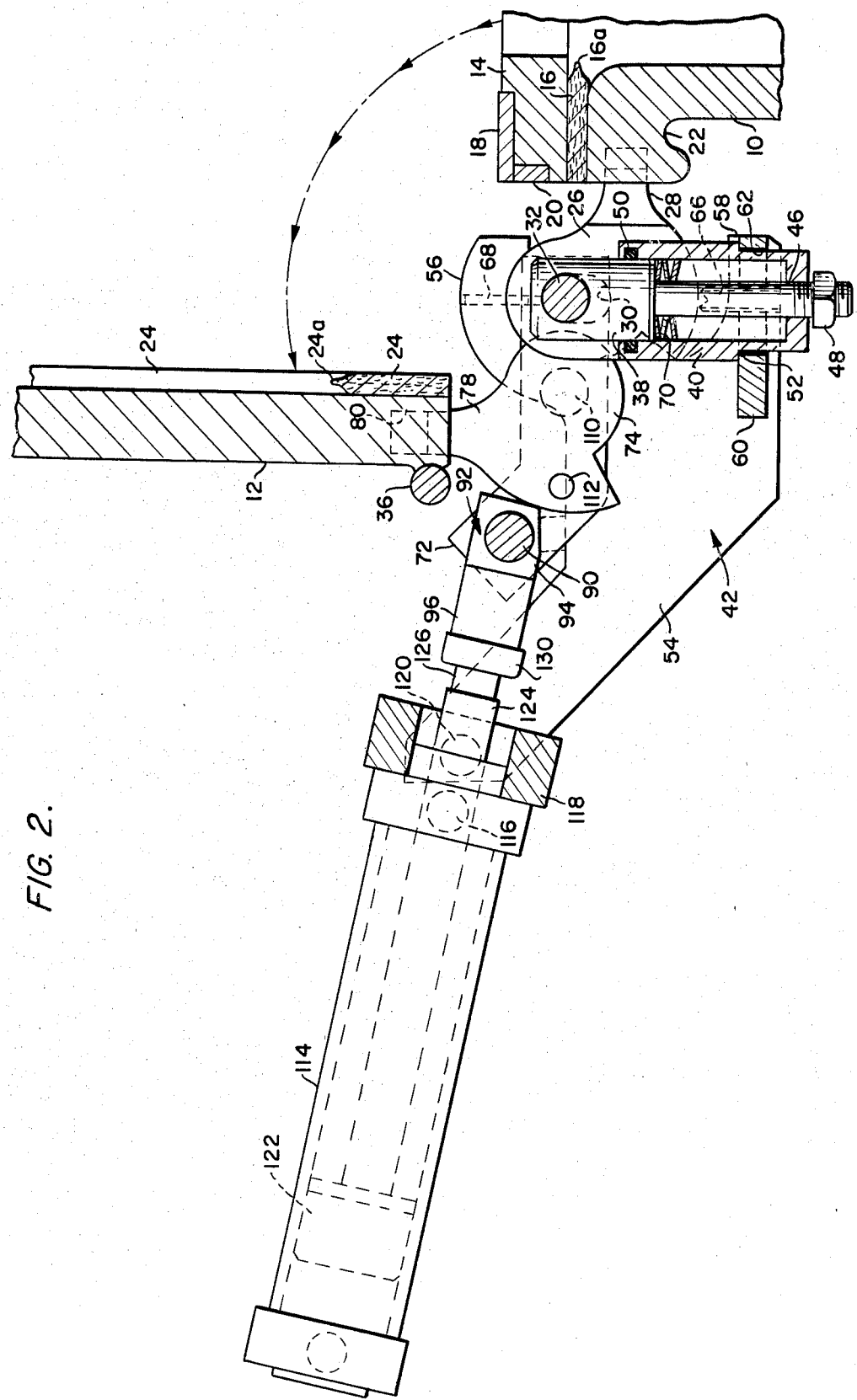
FIG. 2 is a view like that of FIG. 1 with the cover in the open position.

A nozzle 10 of a vessel, such as a glass-lined reactor, which may have a substantial internal capacity may be seen in FIGS. 1 and 2. Because of the size of the vessel, the nozzle oftentimes is referred to as a "manway nozzle" or "manhole nozzle", and the cover for closing the nozzle, illustrated as a cover 12, similarly is referred to as a "manway cover" or "manhole cover". Within the context of this description, these structures will be referred to simply as "nozzle" and "cover".

The vessel forms no part of the present invention other than that it provides a situs or environment for the glass-lined type nozzle. The glass-lining is not illustrated in the figures, and, because of the size of the structures, only a portion of the nozzle and cover is shown.

With continued reference to FIGS. 1 and 2, a protection ring 14 is supported on the upper surface of nozzle 10, and a gasket 16 is located between the upper surface and the protection ring. A wearplate 18 is carried by the protection ring within an annular cutout extending from the outer edge of the protection ring toward the inner edge. The wearplate comprises a major portion of the upper surface of the protection ring. A retaining band 20 extends around the retaining ring within an annular recess communicating with the cutout. The retaining ring may comprise two half-circular band portions, each of which carries a plurality of ears (not shown) extending outwardly of the band and a component (not shown) at each end for securing the two half-circular band portions in tight securing engagement within the recess. Any conventional securing components may be used. The ears provide a fixed support location for mounting protection ring 14 on nozzle 10. Again, any conventional structure may be used. In one manner of mounting the protection ring securely, the ears may each include a bore for receipt of the shank portion of a bolt, the end of which may be threaded into a clamp, such as a J-clamp. The finger portion of the J-clamp, then, may be received under an annular ridge of the nozzle and into the area of recess 22.

Protection ring 14, only a portion of which is shown for reasons already set out, is formed of a material having a resilient capacity thereby to provide some yielding capability upon any impact on the nozzle 10 resulting upon closure of cover 12, as well as a capability of distribution of any forces of impact. Further, the material should be one to display a capacity for overcoming any slight defect in its surface, as may result from a minor gouge which otherwise would effect the sealing capacity of the cover as it acts on the protection ring and gasket structure. Preferably, the protection ring is constructed of solid glass-filled polytetrafluoroethylene ("Teflon"). This material has a demonstrated capability, as required, including long-life, in many types of use. Wearplate 18 may be formed of "Teflon," as well. The purpose of the wearplate is one of a buffer, that is, to prevent damage to the protection ring and to provide a component, in the event damage through use may result, that is relatively rapidly and easily replaced.

A gasket 24 is supported on the underside of cover 12, see FIG. 1. In the closed-cover position this gasket is disposed in position juxtaposed protection ring 14 and wearplate 18. Gaskets 16, 24 while not clearly illustrated in FIGS. 1 and 2, include an outer envelope and a member within the envelope. The surfaces of the envelope may be constructed by substantially laying open an annular disc of plastic material of several mils thickness from the outer diameter toward the inner diameter providing a lip 16a, 24a situated toward the axis of nozzle 10. The envelope may be "Teflon," and the member an annular disc of a compressible material, such as asbestos or the like.

Figure 3:
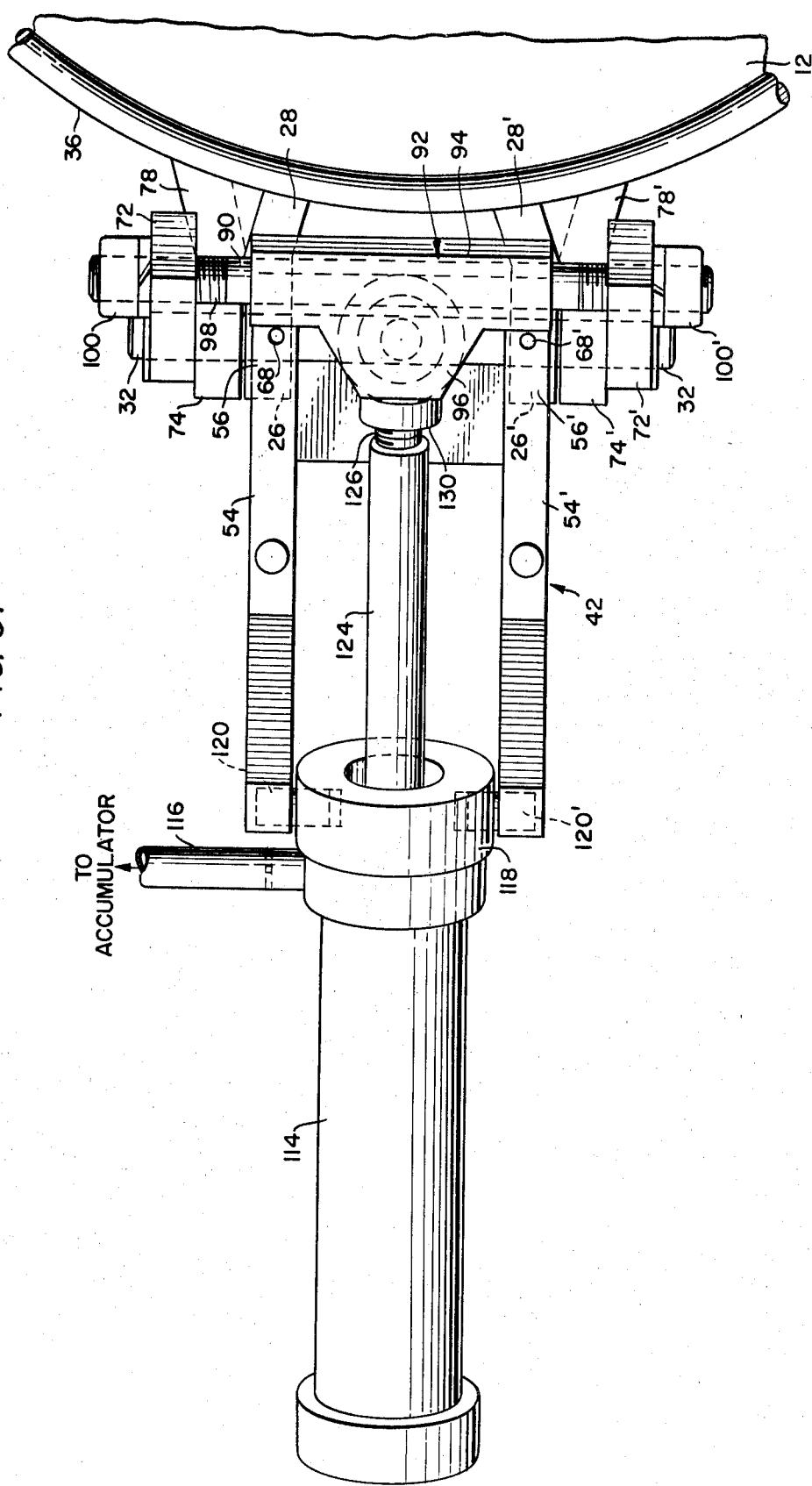
FIG. 3 is a plan view of the structure of FIG. 1.
Figure 4:
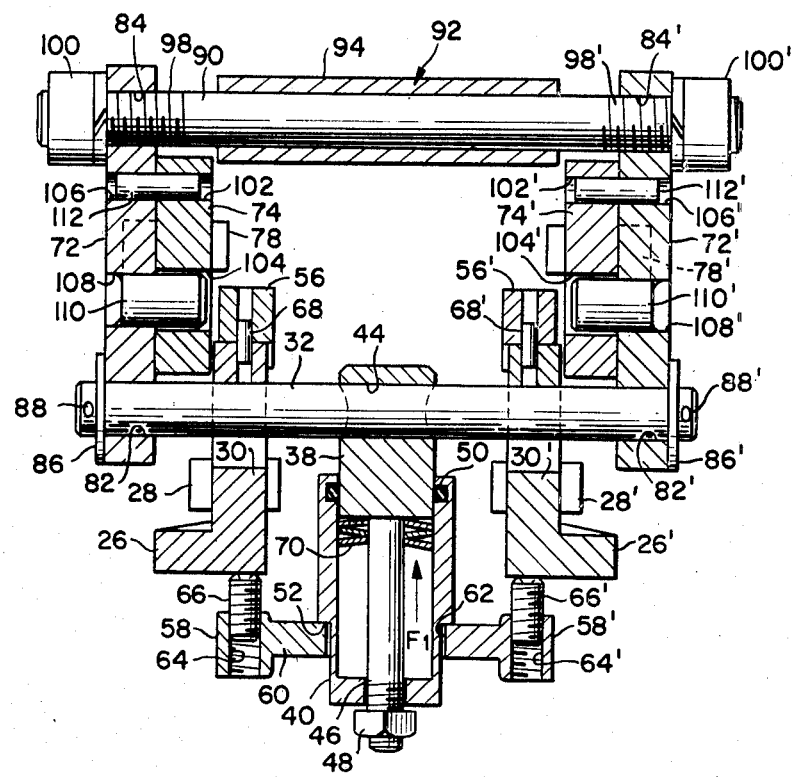
FIG. 4 is a view in section as seen along the line 4—4 in FIG. 1.

With reference to FIG. 4, it may be appreciated that the left-hand structure, the structure illustrated, also, in FIGS. 1 and 2, duplicates or is the mirror image of the right-hand structure. Accordingly, the discussion to follow, while oftentimes in the singular, should be considered as directed to the duplicative or mirror image structure identified by same numeric indicia followed by a prime. As seen in FIG. 4, a hinge lug 26 including a bracket 28, which may be integral with the hinge lug, is supported by nozzle 10. The bracket 28, 28', as perhaps best illustrated in FIG. 3, are angularly spaced one from the other around the perimeter of the nozzle. The hinge lug includes an opening 30 of elongated slotted outline for reasons as have been discussed above. A pivot pin 32 providing a pivot axis for cover 12 is received through the openings in hinge lugs 26, 26'.

According to an important aspect, the structure of the present invention includes an assembly for providing a constant force on pivot pin 32 urging the pivot pin upwardly in the opening so that cover 12, and more particularly gasket 24, during initial movement to the open condition and during final movement to the closed condition does not contact wearplate 18. The constant force upwardly on the pivot pin is such that in the closed cover position, when the cover is not releasably locked to the nozzle, there is a clearance 34 between gasket 24 and wearplate 18 of protection ring 14. When the cover is releasably locked to the nozzle by a plurality of C-clamps (not shown), for example, received around ring 36 on the cover and the ridge forming recess 22, the locking force is applied against the force on the pivot pin which then locates in a lower region of the opening. The clearance quite obviously is eliminated, and a seal is maintained by gasket 24.

The assembly providing a constant force on pivot pin 32 includes a lifter 38, housing 40 providing an open internal chamber within which the lifter is capable of movement, a mounting bracket 42 and an operative member within the chamber of the housing providing the force $F_1$. As illustrated in FIG. 4, pivot pin 32 is located within the upper confines of openings 30, 30'.

Lifter 38 preferably comprises a solid metal body such as a low carbon steel. The lifter is machind or drilled to include a bore 44 which may be reamed at each end. A bore (not shown) is also provided and extends into the base along an axis normal to that of bore 44. The lifter, finally, may be zinc-plated to a thickness of approximately 0.0002 inch.

Housing 40 is open at one end and closed at the other. Lifter 38 is received through sliding engagement in the chamber of the housing and adapted for reciprocable movement under action of force $F_1$ or under action of a force exerted on the cover when moved to a sealing disposition. A rod 46, threaded throughout a short distance along each of its ends, extends into the chamber through an opening in the closed end of housing 40. The rod is threaded into the vertical bore in lifter 38, and a lock nut 48 is threaded on the other end of the rod as a means of compressing spring for insertion of pivot pin 32. The rod, thus, guides the spring. An O-ring 50 is received in an annular cutout within the wall of the housing adjacent the open end thereby to provide a seal between the lifter and the chamber for exclusion of dirt.

The housing 40, also, is preferably formed of a low carbon steel and, after machining or otherwise to form an annular shoulder 52, zinc-plated to a thickness of about 0.0002 inch. Rod 46 is formed of medium carbon steel, similarly zinc-plated after machining; and the pivot pin may be a cold-finished, heat treated, rod.

Mounting bracket 42, see FIGS. 1, 2 and 3, includes a pair of legs 54, 54', each of which terminates in a C-shape, opening including an upper portion 56, and a lower portion 58. A mounting support 60 extends between the lower portions. The mounting support includes an opening 62, and, as perhaps best seen in FIG. 4, housing 40 is received into the opening to the depth of shoulder 52.

The assembly providing the constant force for elevating the pivot axis of pivot pin 32 is mounted on hinge lugs 26, 26'. To this end, the upper portions 56, 56' of legs 54, 54' are received around the top surface of the respective hinge lugs, and the lower portions 58, 58' are located below the respective hinge lugs. Each lower portion of each arm is provided with a bore 64 which may be internally tapped, and a set screw 66 is threaded into the bore and into engagement with the lower surface of a respective hinge lug 26, 26'. Each upper portion of each leg, and the upper surface of each hinge lug, may be provided with a drilled opening for receipt of groove pin 68. The purpose of the groove pins is to prevent rotation of mounting bracket 42 on the hinge lugs 26, 26'. However, if the surface to surface contact between the upper portions of the legs of the mounting bracket and the hinge lugs is chosen so that one complements the other the need for the groove pins may be obviated.

Any particular means which will provide the force $F_1$ may be utilized in carrying out the invention. To this end, the housing 40 may be constructed so that it acts as a cylinder and lifter 38 a piston movable in response to a fluid, or a spring force may be exerted within the chamber of the housing to act between the closed end and the lifter. In a preferred form of the invention the force $F_1$ is provided by a multiplicity of disc springs 70. In the preferred form of the invention rod 46 serves as a spring guide to direct the force against the lower surface of lifter 38.

The mounting bracket may be formed of ductile iron, and, again, as discussed in connection with other component parts, is zinc-plated to a thickness of about 0.0002 inch after machining.

The movable component of the hinge is connected to cover 12 and supports the cover in movement between opened (FIG. 2) and closed (FIG. 1) positions. The movable component of the hinge may be seen, perhaps, to best advantage in FIG. 3. Referring to that figure, the movable component of the hinge includes an adaptor 72 and a support element 74 having a leg 78 extending from the support element for connection with the cover. As illustrated in FIGS. 1 and 2, the leg of each support element is welded to the peripheral edge of the cover. Adaptor 72 comprises a plate which may be of an elongated oval configuration, or with a configuration having an elongated oval outline throughout a major portion of its length extending to an offset region at the other end. The latter configuration is illustrated in the figures. A bore 82 is located within the region of one end of the adaptor, and a second bore 84 is located within the region of the other end of the adaptor. Adaptor 72 is received on pivot pin 32. To this end, the pivot pin is received through bores 82, 82', and the adaptors are secured on the pivot pin by means of a washer 86 and a pin 88 received through an opening near the ends of the pivot pin. The pin may be a cotter pin or similar type of locking structure.

A bolt 90 extends through bore 84 in the other end of adaptor 72, and a rod eye 92, perhaps seen to best advantage in FIG. 3, is mounted on the bolt. The rod eye which will be discussed below comprises an elongated rectangular body 94 and an extension 96 having a somewhat pyramidal shape located centrally of the body and extending in a direction substantially normal to an axis through the body. Rod eye 92 is received on bolt 90 by provision of an elongated bore through the body, and the bolt is secured to adaptor 72. To this end, the bolt is threaded from each end within a region 98, and a lock nut 100 is received on the bolt.

Support element 74 includes a pair of bores 102, 104, the latter of which may be somewhat larger in internal diameter. Adaptor 72 includes substantially a like pair of bores 106, 108. A pin 110 extends from bore 108, inwardly of the adaptor in the direction of the pivot pin which serves as a mounting pin for mounting support element 74. Pin 110 may be welded or otherwise immovably secured in bore 108. A groove pin 112 received into bores 102, 106 immobilizes the support element on the adaptor.

The structure for assisting in the opening and closing of the cover may be seen to best advantage in FIGS. 1, 2 and 3. This structure may comprise any form of operator capable of developing a pulling force, $F_2$, along an axis as illustrated in FIG. 1 on rod eye 92 so that adaptor 72 and support element 74 move conjointly about pivot pin 32 and the cover moves between the positions in FIGS. 1 and 2. As has been previously discussed, the cover 12 (see FIG. 1) is somewhat elevated above nozzle 10 by a distance equal to the clearance 34. As also discussed, the clearance is maintained under circumstances that the cover is not sealingly secured to the nozzle by action of the disc springs. And, it is through this action that physical contact between gasket 24 and wearplate 18 of protection ring 14 during movement of cover 12 from the FIG. 1 to the FIG. 2 position, as well as in return of the cover from the FIG. 2 to the FIG. 1 position, is prevented.

The operator for assisting in opening and closing cover 12 may comprise an hydraulic cylinder, mechanical structure, such as a multiplicity of disc springs, a balance spring-type operator, a hydro-pneumatic type of operator and other known structures.

In a preferred embodiment of the invention, the structure for assisting in opening and closing the cover comprises an hydraulic cylinder 114 whose internal chamber is in fluid communication with an accumulator (not shown) through a conduit 116. The conduit may include an orifice for speed control, as desired. A support ring 118 is connected at one end of cylinder 114. Any manner of mechanical connection of the hydraulic cylinder and support ring may be employed. for example, the support ring may be mounted by a pair of pins 120, 120' extending from the legs 54, 54' of mounting bracket 42. This manner of support permits movement of hydraulic cylinder 114 pivotally as will be necessary during opening and closing of cover 12. As illustrated in FIGS. 1, 2 and 3 the pins 120, 120' are carried by the legs remote from the portions providing the C-shaped opening and extend into cylindrical recesses within diametrically opposed surface locations on the support ring.

The hydraulic cylinder 114 is only generally illustrated in FIGS. 1 and 2 but may be considered to include a piston 122 movable within the cylinder chamber and a rod 124 movable conjointly with the piston. The rod is of a length to extend from the hydraulic cylinder toward extension 96 of rod eye 92. A stud 126 which is threaded throughout its length is threaded into an axial bore in the end of rod 124 and into a bore 128 in extension 96. A nut 130 secured to the stud provides locking of the adjustment in the mechanical connection between rod 124 and rod eye 92.

The adaptor 72 and rod eye 92 preferably are formed of ductile iron (60-45-15), while the support ring 118 preferably is formed of low carbon steel. These structures, after any necessary machining, are zinc-plated to the thickness previously discussed. Other structures not specifically mentioned may be formed of a material suitable for the use that the structure is to provide, as may be apparent to those skilled in the art. While some specifics of construction have been set out, the discussion should be considered exemplary in presentation rather than in a limiting sense.

The strucure of the present invention including the assembly for providing a constant force on the pivot pin which supports the movable hinge components thereby to raise the pivot axis and the assembly providing assist in the opening and closing of a cover may be mounted on vessels for which it is designed, as well as on existing vessels. In this manner, the problem and disadvantages of the prior art may be uniquely overcome.

We claim:

1. A vessel formed by a closed-wall structure including a nozzle providing an entryway to the interior of said structure, a cover movable from a position at which it is juxtaposed said entryway to and from positions either to seal said entryway or to open said entryway, a pair of lugs, said lugs being mounted on said vessel in spaced relation, each lug extending from said vessel and formed with an elongated vertical opening, a pin extending through said openings in said lugs, hinge means mounted on said cover and received on said pin for movement of said cover pivotally to and from said entryway open positions, and means acting between said lugs and pin exerting a constant force urging said pin upwardly in said vertical openings whereby said cover may locate to said juxtaposed position providing a clearance between said cover and nozzle at least within the region between said lugs under conditions that said cover is out of sealing engagement.

2. A vessel formed by a closed-wall structure including a nozzle providing an entryway to the interior of said structure, a cover movable from a position at which it is juxtaposed said entryway to and from positions either to seal said entryway or to open said entryway, a protection ring supported on said nozzle and sealing means between said protection ring and the surface of said nozzle, means securing said protection ring in sealing engagement with said surface, a pair of lugs, said lugs being mounted on said protection ring in spaced relation, each lug extending from said protection ring and formed with an elongated vertical opening, a pin extending through said openings in said lugs, hinge means mounted on said cover and received on said pin for movement of said cover pivotally to and from said entryway open positions, and means acting between said lugs and pin exerting a constant force urging said pin upwardly in said vertical openings whereby said cover may locate to said juxtaposed position providing a clearance between said cover and said protection ring at least within the region between said lugs under conditions that said cover is out of sealing engagement.

3. The vessel of claim 1 or claim 2 wherein said hinge means includes a second pair of lugs, and a leg carried by each lug of said second pair, said legs of said hinge means being mounted on said cover.

4. The vessel of claim 3 including a bore in each lug of said second pair of lugs, and said pin received through said bores in said second pair of lugs.

5. The vessel of claim 3 including a pair of adapters, each adapter comprising a plate elongated in length to accommodate the thickness of said protection ring, a bore in one end of each adapter, said pin received through said bores in said adapters, and means connecting each adapter and lug of said second pair so that there is conjoint movement of said second pair of lugs, said adapters and cover.

6. The vessel of claim 3 including a gasket, said gasket carried by the undersurface of said cover to seal said entryway.

7. The vessel of claim 1 or claim 2 wherein said means acting between said lugs and pin includes bracket means mounted stationarily on said lugs, and means supported by said bracket means connected to said pin for exerting said constant force.

8. The vessel of claim 7 wherein said bracket means includes a mounting surface extending between said lugs, and said supported means exerting said constant force connected substantially within the region of the mid point of said pin.

9. The vessel of claim 8 wherein said supported means includes a housing, a follower element received in said housing and movable in opposite directions, said follower element including a bore, said pin extending through said bore, and means within said housing exerting said constant force on said follower element whereby said pin is urged upwardly.

10. The vessel of claim 9 wherein said urging means includes a plurality of disc springs confined by said housing and acting between said housing and said follower element.

11. The vessel of claim 7 wherein said bracket means includes a pair of legs, each leg including a C-shaped opening at one end thereby to define an upper and a lower portion, said upper portions being mounted on said lugs and said lower portions being located below said lugs, a mounting surface extending between said lower portions, and means acting between said lower portions and lugs thereby to provide said stationary mount.

12. The vessel of claim 11 wherein said supported means includes a housing, a follower element received in said housing and movable in opposite directions, said follower element including a bore, said pin extending through said bore, means within said housing exerting said constant force on said follower element whereby said pin is urged upwardly, and said mounting surface providing means for mounting said housing so that said constant force is exerted within the region of the mid point of said pin.

13. The vessel of claim 11 wherein said lower portions are provided with an opening, and a member threaded in each opening to act against a lug thereby to draw said upper portion down on an upper surface of said lugs.

14. The vessel of claim 11 including means to provide a power assist in moving said cover to and from said entryway open positions, said power assist means connected between said legs opposite said C-shape opening, a rod connected to said hinge means, a body carried on said rod, and means connecting said power assist means and said body whereby a force exerted on said body causes said hinge means to pivot about said pin.

15. The vessel of claim 14 wherein said power assist means comprises a cylinder, a piston movable in said cylinder under control of a pressure medium, and wherein said connecting means comprises a piston rod.

* * * * *

UNITED STATES PATENT AND TRADEMARK OFFICE
CERTIFICATE OF CORRECTION

PATENT NO. : 4,372,461
DATED : February 8, 1983
INVENTOR(S) : MICHAEL J. LERMAN ET AL It is certified that error appears in the above-identified patent and that said Letters Patent are hereby corrected as shown below:

Title page,

Item 73 of the masthead of the patent correct the identification of the assignee, as follows:

-- De Dietrich (USA), Inc. --.

Column 7, line 11, change "for" to --For--.

Signed and Sealed this

Twenty-ninth Day of November 1983

[SEAL]

*Attest:*

GERALD J. MOSSINGHOFF

*Attesting Officer*     *Commissioner of Patents and Trademarks*